(No Model.)
C. CLARKE.
LAWN WEEDING IMPLEMENT.
No. 357,907. Patented Feb. 15, 1887.
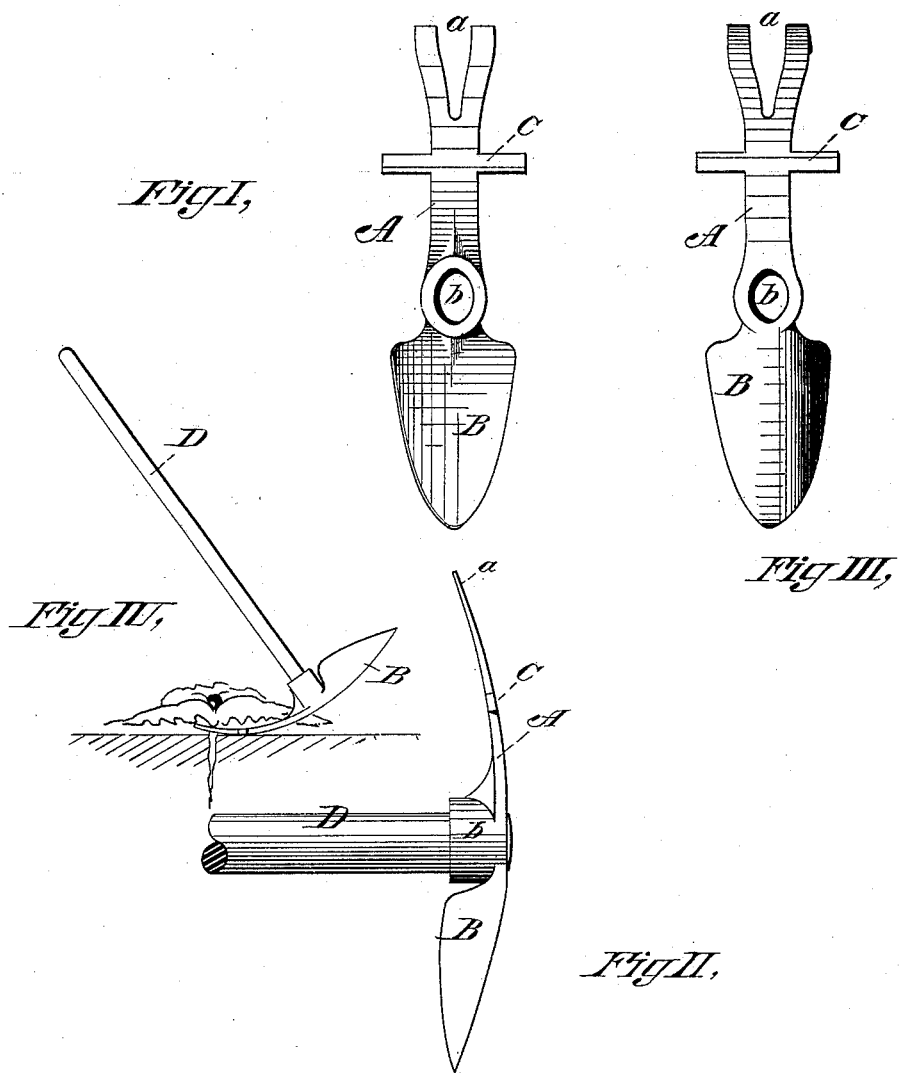

UNITED STATES PATENT OFFICE.

CHRISTOPHER CLARKE, OF NORTHAMPTON, MASSACHUSETTS.

LAWN-WEEDING IMPLEMENT.

SPECIFICATION forming part of Letters Patent No. 357,907, dated February 15, 1887.

Application filed July 17, 1886. Serial No. 208,253. (No model.)

*To all whom it may concern:*

Be it known that I, CHRISTOPHER CLARKE, a citizen of the United States, residing at Northampton, county of Hampshire, and State of Massachusetts, have invented a new and useful Improved Lawn-Weeding Implement, of which the following is a specification.

This invention relates to implements for weeding, and its object is to provide a tool for extracting the dock and plantain-weeds by the root from finely-kept lawns without injury to the grass-turf, and without the necessity of bending the body into the painful position which has hitherto made the removal of these weeds a slow and laborious process. To that end I combine with a handle long enough to permit the operator to maintain an erect position two blades projecting in opposite directions from the end of the handle, one of which is peculiarly adapted for the removal of the dock and the other for the uprooting of the plantain-weed, as hereinafter more particularly described, and combine with the two blades and handle a foot-bar and fulcrum-piece, as and for the purpose hereinafter set forth.

My invention is fully illustrated in the accompanying drawings, in which—

Figure I is a front elevation of my tool removed from the handle. Fig. II is a side elevation of the tool attached to its handle. Fig. III is a view in reverse of Fig. I, and Fig. IV is a reduced view of the complete device in operation.

The two blades A B are forged or otherwise formed integral, with an eye or socket, b, to receive the end of a handle, D. The ends of the blades A B are inclined inward, and preferably in a gradual curve, each way from the handle, to leave the rear of the tool an even flush surface, as seen in Fig. II, so that when resting upon the surface of the lawn, as seen in Fig. IV, it may be rocked by the handle over the whole extent of the tool without having any stud or projection therefrom dug into the sod. The blade A is an elongated flat bar with its greater diameter at right angles to the axis of the handle, and terminated by a bifurcated end, *a*, as seen in Fig. I. The end *a* is adapted to inclose the large strong root of the dock.

Intermediate to the handle D and end *a* is a bar, C, having ends projecting in the same plane upon each side of blade A, as seen in Figs. I and III. The projecting ends of bar C are preferably formed from the blade A in the casting or forging of said blade, and to have their outer surface flush with the outer surface of the blade. The ends of bar C have for their object the providing of a foot-rest for both feet, as well as an auxiliary flat surface, forming a fulcrum for either blade A B when the tool is rocked by the handle D. The blade B is of the form of a concave spatula-ended trowel, with the concavity inward. This blade is designed for the smaller plantain-weed, and in use it is not necessary to strike a blow with the tool, which, missing the exact place, would be liable to injure the grass; but the blade B is inserted under the leaves, and if the mere weight of the tool, assisted by the pressure of the arms, is not sufficient, one or both feet are brought to bear upon the rest C to give the blade B a hold upon the weed enough to remove it upon rocking the tool.

In the case of the burdock and yellow dock, with their long powerful single roots, it is advisable, in order to increase the leverage, to have a fulcrum close to the end *a* grasping the root, and after the bar C has served as a foot-rest, to enable the end *a* to be forced over the root.

By the implement above described a lawn may be kept clear of these common pests with little labor and the least injury to the grass.

Now, having described my invention, what I claim is—

The within-described combined dock and plantain weeding tool, consisting of a handle, D, a socket, b, a trowel-blade, B, and a bifurcated blade, A, extending from opposite sides of said socket, and adapted, as shown, to be rocked by the handle over their combined rear surface, and a foot-rest and fulcrum, C, combined with the two blades, as and for the purpose set forth.

CHRISTOPHER CLARKE.

Witnesses:
R. F. HYDE,
LYMAN H. PERKINS.